United States Patent [19]

Ludwig

[11] Patent Number: 4,765,217
[45] Date of Patent: Aug. 23, 1988

[54] INSERTABLE SAW TOOTH

[76] Inventor: Andre M. Ludwig, 101 Redwood Avenue, Thunder Bay, Ontario, Canada, P7C 1Z3

[21] Appl. No.: 918,344

[22] Filed: Oct. 14, 1986

Related U.S. Application Data

[63] Continuation-in-part of Ser. No. 771,215, Aug. 30, 1985, abandoned.

[51] Int. Cl.⁴ ............................................. B27B 33/12
[52] U.S. Cl. ........................................ 83/841; 83/835; 83/255; 83/842
[58] Field of Search .................. 83/835, 839, 841, 840, 83/843, 842, 854, 838, 844, 845, 851, 853; 409/47

[56]  References Cited

U.S. PATENT DOCUMENTS

| | | | |
|---|---|---|---|
| 3,261,384 | 7/1966 | Henderson | 83/839 |
| 3,270,786 | 9/1966 | Kolesh et al. | 83/842 |
| 3,986,421 | 10/1976 | Schultz | 83/854 |
| 4,084,470 | 4/1978 | Reed | 83/841 |

Primary Examiner—Donald R. Schran

[57]  ABSTRACT

Wood-cutting apparatus with an insertable tooth in which the blade is positioned radially outwardly on a flat, elongated metallic plate and comprises two side edges, each of which: (a) extends generally radially (i.e parallel to a radius of the disc in which the tooth is inserted); and (b) is positioned ahead of the plate and other portions of the blade so that the side edges lead the tooth as the disc rotates in a predetermined rotational direction. The cutting edge of the blade extends along the most radially outward extent of a region of the blade connecting the two side edges, the connecting region being positioned rearwardly from those side edges in the rotational direction.

19 Claims, 2 Drawing Sheets

INSERTABLE SAW TOOTH

BACKGROUND OF THE INVENTION

This application is a continuation-in-part of my earlier co-pending U.S. patent application Ser. No. 771,215, filed Aug. 30, 1985 now abandoned.

This invention relates to wood-sawing apparatus, particularly slashers that render logs suitable for paper pulp manufacturers.

Such saws may include a rotating disc that has slots into which replaceable teeth are inserted. Cutting is accomplished by beveled tooth surfaces or by hard (e.g. carbide) blade members brazed to the ends of the teeth. As the blades wear out, the teeth are removed from the slots and replaced or reconditioned by replacing the carbide blade member.

One such slasher is disclosed in Reed U.S. Pat. No. 4,084,470. The teeth in Reed are elongated and have a "cubic trapezoid" blade brazed into a notch at the radially outward end of the tooth. The face of the blade is planar and parallel to a disc radius, and the sides of the blade are relieved from the base at an angle of from 2°–20°. Each of the blades is positioned in the same rotational plane and at the same radial distance from the axis of disc rotation.

Other references concerning saws with insertable teeth are discussed below.

Kendall U.S. Pat. No. 1,141,063 and McClean U.S. Pat. No. 1,105,153 disclose teeth having sharpened edges (rather than carbide blades) on faces that are beveled with respect to the direction of rotation; edges of adjacent teeth around the circumference are beveled in opposite directions.

Hiltebrand U.S. Pat. No. 3,071,027 discloses a circular saw having an insertable support member and a hard-steel cutting blade. The blade "is formed symmetrically with respect to the central plane of the disc" and its top is provided with a V-shaped groove that is an extension of a support-member groove used to guide the member into the disc. The blade "ensures a perfect guiding of the saw blade in the work piece." There is no indication that the front of the blade is grooved to form a beveled cutting surface.

Phillips U.S. Pat. No. 560,426 discloses a tooth with a longitudinal groove and a straight chisel edge (8 in FIG. 6) perpendicular to the radius and to the direction of rotational movement. At the top of the tooth, the outside edges (7 in FIG. 5) found at the end of the groove are rounded and then sharpened to form the chisel edge (see col. 2, lines 87–103).

Thornton U.S. Pat. No. 2,160,525 discloses another insertable tooth having blades that can be fixed to a rotating disc. The angle of the blades can be adjusted.

Evancic U.S. Pat. No. 3,885,488 discloses insertable teeth that are angled in the direction of rotation and have a symmetrically angled cutting edge.

Other saws having removable teeth include Roberts, U.S. Pat. No. 2,703,118 disclosing a tooth 7 mounted on an interlocking rounded member 8. Kolesh et al. U.S. Pat. No. 3,270,786 discloses a replaceable cutting bit 13 locked into a socket 12 of a saw plate by means of a generally rounded shank 14. Beckner U.S. Pat. No. 3,004,902 also discloses bit 20 comprising a head 22 and a shank 30 to be inserted in a generally rounded socket 11.

SUMMARY OF THE INVENTION

The invention features wood-cutting apparatus with an insertable tooth in which the blade is positioned radially outwardly on a flat plate and comprises two side edges, each of which: (a) extends generally radially (i.e. parallel to a radius of the disc in which the tooth is inserted); and (b) is positioned ahead of the plate and other portions of the blade so that the side edges lead the tooth as the disc rotates in a predetermined rotational direction. The cutting edge of the blade extends along the most radially outward extent of a region of the blade connecting the two side edges, the connecting region being positioned rearwardly from those side edges in the rotational direction.

In preferred embodiments: the side edges are offset outwardly from opposite sites of the plate; the connecting region extends radially outwardly to a central terminus that is approximately co-extensive with the furthest radially outward extent of the plate; and each side edge extends radially outwardly further than the central connecting region so that each side edge forms a cutting point where it joins the cutting edge. The central connection region is preferably either a generally concave surface extending between the edges or it is two generally planar faces, each of which is beveled rearwardly (away from the direction of rotation) from one of the side edges to a generally central area where the faces intersect. With a concave connecting region, the cutting edge comprises a continuous curve extending between the side edges. With a connecting region formed by beveled planar faces, the cutting edge comprises two straight linear segments intersecting at the central portion. The tooth may have an elongated flat plate that is locked into an elongated slot on the rotating disc by a dowel that fits within an opening defined in part by the disc and in part by the plate. Alternately, the disc slots may be rounded, or generally arcuate, and the tooth surface facing away from the direction of rotation is convex to cooperate with the slot; in that case, the means for cooperatively locking the tooth in the slot is a metal member having a convex rounded surface to cooperate with the rounded slot.

The invention provides improved efficiency by increasing the available amount of cutting edge without unacceptably increasing horsepower requirements. In addition, the invention avoids the need to stagger left-handed and right-handed blades, thus simplifying inventory requirements and replacement operations. The invention also insures proper placement of the teeth and blades around the circumference of the saw. The cutting action provided by the invention is smooth, resulting in greater efficiency. In particular the tooth of the invention provides a smooth surface in the cut, reducing friction and giving a better butt. Also, pressure is exerted directly rearwardly (perpendicular to the saw axis) so as to avoid angular pressure that could loosen the attachment between the tooth and the saw disc.

Other features and advantages of the invention will be apparent from the following description of the preferred embodiments and from the claims.

DESCRIPTION OF THE PREFERRED EMBODIMENTS

I first briefly describe the figures.

Drawings

Structure

Figure 1:
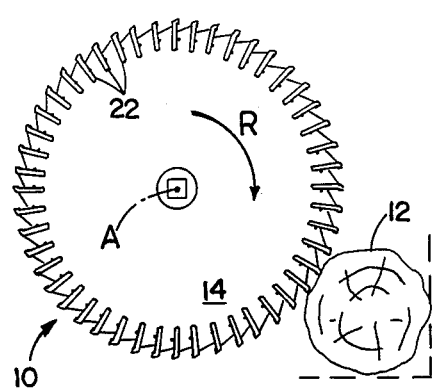
FIG. 1 is a highly diagrammatic side view of a wood slasher with insertable teeth.

In FIG. 1, slasher 10 is intended for slashing log 12 into blocks of a uniform length suitable for use in a paper pulp mill. Log 12 is advanced as the blocks are cut and slasher 10 has a disc 14 that rotates on a central axis A perpendicular to disc 14 in the direction of rotation designated by arrow R. Reed U.S. Pat. No. 4,084,070, which is hereby incorporated by reference, discloses an example of suitable advancement and disc-drive mechanisms.

Figure 2:
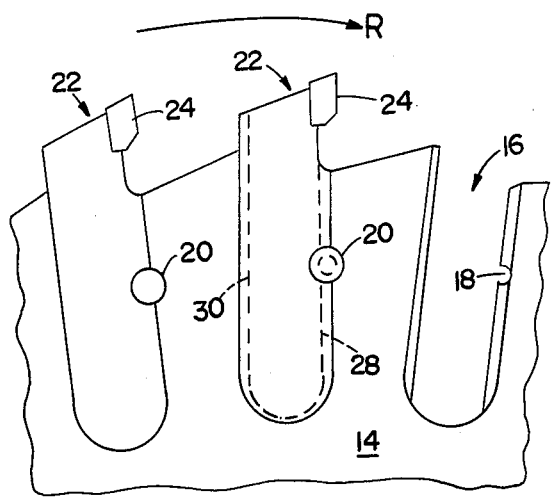
FIG. 2 is an enlarged side view of a part of the slasher of FIG 1.
Figure 3:
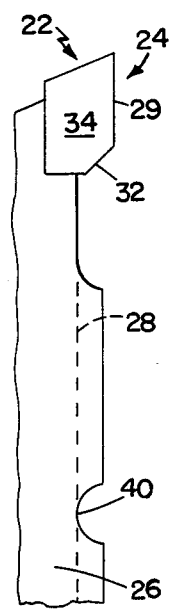
FIG. 3 is a side view of a portion of an insertable tooth of the slasher of FIG. 1.
Figure 5:
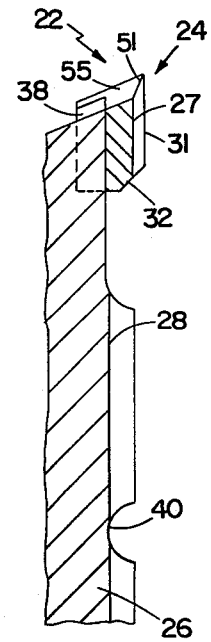
FIG. 5 is a side view of a portion of the tooth of FIG. 3, partly broken away and in section.

A portion of the periphery of slasher disc 14 is shown in FIG. 2 and has multiple elongated slots 16 (one of which is labeled) shaped to receive insertable teeth. Slots 16 include a rounded indentation 18 to receive a cylindrical locking dowel 20 that fixes each tooth in the slot.

FIGS. 3–6 show one embodiment of a tooth 22 for insertion in slot 16. Tooth 22 has a blade portion 24 that is brazed in position at the front (i.e., facing the direction of rotation) of the radially outward end of a plate 26. Blade portion 24 is the tungsten carbide cutting element. Plate 26 can be a softer, cheaper steel.

Plate 26 is elongated and flat, having guide slots 28 and 30 in its front and rear edges, respectively. A rounded indentation 40 cooperates with indentation 18 and dowel 20 to fix the tooth in place. The top of plate 26 angles radially inwardly from the front to the back of the plate.

Blade 24 is shaped to have a double beveled front face comprising a first planar surface 23 and a second planar surface 25 that meet in a medial line 27, extending generally radially along the front blade face. Surfaces 23 and 25 extend sidewardly and forwardly from medial line 27 to cutting edges 29 and 31, respectively. Edges 29 and 31 extend radially outward to a greater extent than does medial line 27, so that the blade face has a V-shaped top surface. As described below, edges 50 and 51 of the top surface are the primary cutting edges of the blade, and edges 29 and 31 establish the width (or kerf) of the cut.

Cutting points 52 and 53 are formed, respectively, by the intersection of edges 50 and 29 on one side and by edges 51 and 31 on the other side. As the slasher disc 14 rotates, points 52 and 53 are first to contact the wood, piercing and shearing wood fibers running longitudinally along log 12 (i.e. perpendicular to the cut of slasher 10). As the disc rotates, shearing continues along surfaces 23 and 25 which are angled inwardly and rearwardly. Specifically, radial inward angling is demonstrated by angle α formed by the intersection of a plane parallel to the disc radius through the top of the blade. Angle α is preferably between 120° and 160° and most preferably about 140°. Angling rearwardly away from the direction of rotation R is demonstrated by angle B formed by a plane parallel to the disc axis extending through the blade. Angle B is preferably between 130° and 170° and most preferably about 150°.

Blade 24 is wider and extends further radially than does plate 26, and blade 24 includes various beveled surfaces to provide a smooth transition to plate 26. Specifically cutting or back clearance is provided at the sides of the blade by a beveled surface 34 (FIG. 3) and a corresponding surface 36 on the opposite side of the blade. At the top, surfaces 55 slant radially inwardly (front-to-back) at about the same angle as the top of plate 26. Surface 32 is beveled rearwardly at the bottom.

FIGS. 12A–12D show the various angles of the surfaces of the blade of FIGS. 3–7. Those angles are selected to allow high feed rate and to produce large integral chips when cutting through wood fibers (i.e. across the grain). Preferred angles are as follows:

| Angle | Value of Angle |
| --- | --- |
| α | 120°–160° (preferably about 140°–150°) |
| β | 130°–170° (preferably about 140°–150°) |
| Γ | about 20° |
| Δ | about 45° |
| θ | about 3° |
| π | about 3° |

The angle selection is important in making the saw tip durable as well as effective in severing wood fibers. Specifically, the front-to-rear taper (angle π) and the top-to-bottom taper (θ) on the side surfaces, as well as the bevel on the top (angle Γ), allow clearance. The front bevel β and the radial angle α of the cutting points determine the sharpness of cutting points 52 and 53. If angle α were reduced substantially, for example, it would reduce the suitability of the tip for slasher usage.

The use of flat land surfaces 60 (FIG. 12C) which mate with a notch on plate 26 enables lateral and radial alignment of the tooth.

Preferably the tooth width is about 10× to 1× the length of the wood fibers being cut. The resulting chips are large, integral pieces of wood, reducing the heat and binding caused by excessive sawdust. In particular, the tip enables ejection of the chip, and avoids the need for a so-called "raker", a blunt, non-cutting tooth that clears the area cut by previous teeth.

Figure 7:
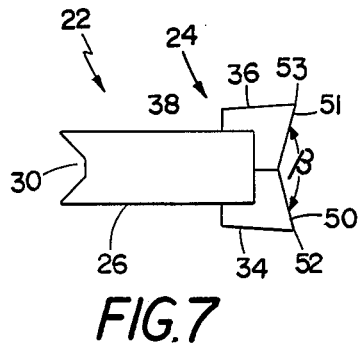
FIG. 7 is a top view of a portion of the tooth of FIG. 3.

Blade 24 is configured to fit into a slot in the front of plate 26 and around the sides of the plate. As best shown in FIG. 7 the blade sides extend rearwardly to form a notch 38 that accommodates plate 26.

Figures 4, 6:
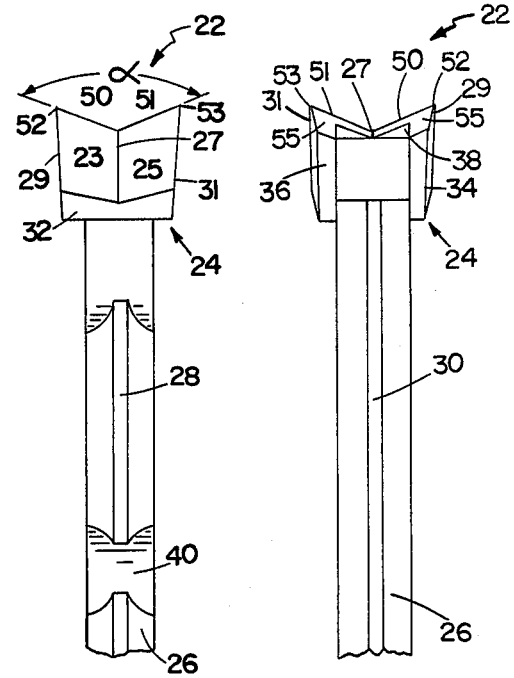
FIG. 4 is a front view of a portion of the tooth of FIG. 3.
FIG. 6 is a rear view of a portion of the tooth of FIG. 3.
Figure 8:
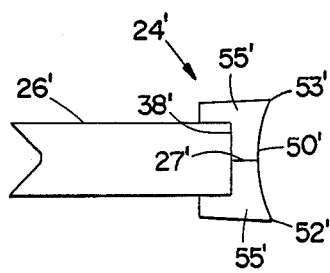
FIG. 8 is a top view of an alternate tooth for use in the slasher of FIG. 1.
Figure 9:
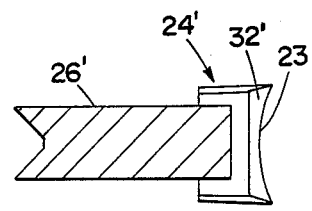
FIG. 9 is a bottom view of the tooth of FIG. 8 partly in section.

The alternate embodiment depicted in FIGS. 8 and 9 is identical to the embodiment of FIGS. 3-6, except that the front face is a convex surface 23' with a radius that creates a rearward displacement at midpoint 27' approximately equal to the rearward displacement of line 27 in FIG. 4. The top cutting edge is designated 50' and other elements of the alternate embodiment are numbered to correspond to the corresponding elements of the embodiment of FIGS. 3-6.

Figure 10:
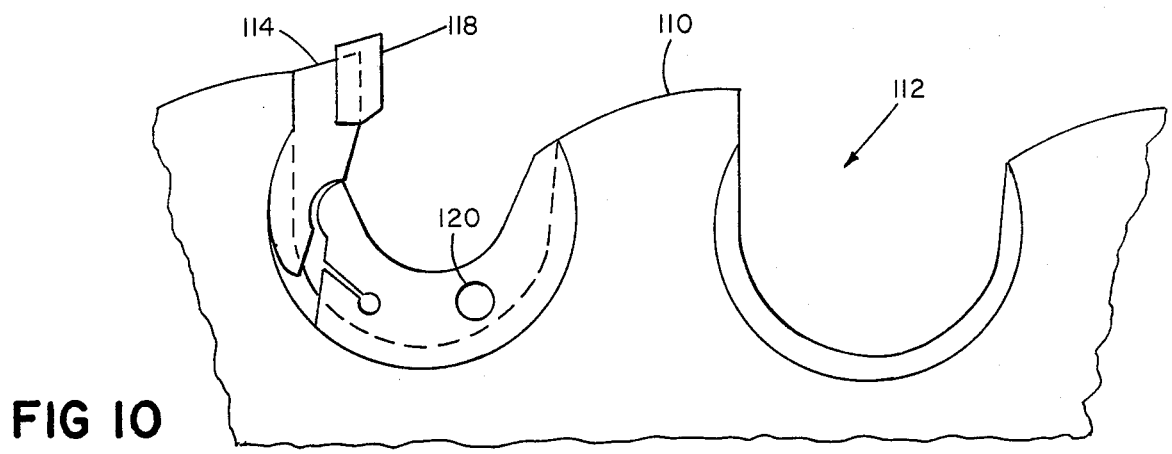
FIG. 10 is a side view of another embodiment of a replaceable saw tooth and disc.
Figure 11:
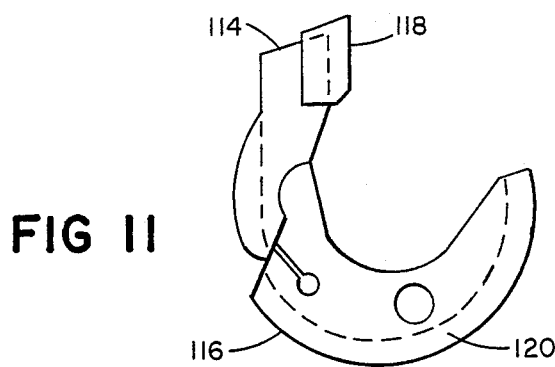
FIG. 11 is a side view of a replaceable tooth for use with the disc of FIG. 10.
Figure 12A:
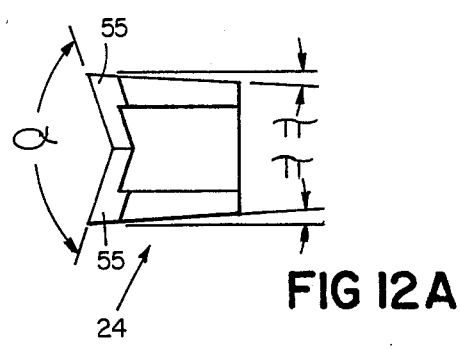
FIG. 12A is a rear view of the blade of the tooth shown in FIGS. 3–7.
Figure 12B:
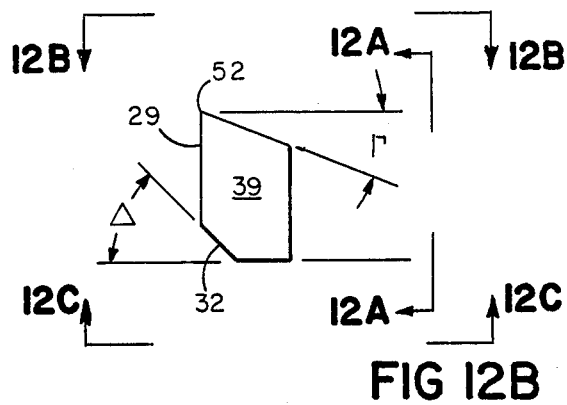
FIG. 12B is a side view of the blade of FIG. 12A.
Figure 12C:
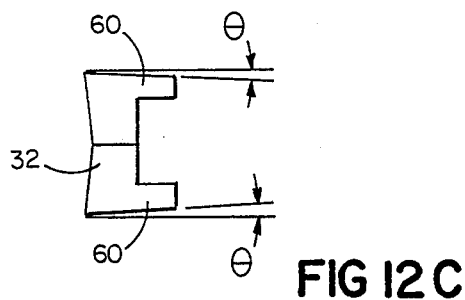
FIG. 12C is a top view of the blade of FIG. 12A.
Figure 12D:
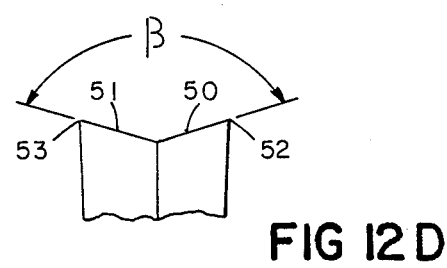
FIG. 12D is a front view of the blade of FIG. 12A.

The alternate embodiment depicted in FIGS. 10 and 11 is a cross-cutting saw having a blade disc 110 with generally rounded recesses 112 evenly spaced around the periphery. Replaceable teeth 114 have a rear surfaces 116 that are convex and mate with recesses 112. Teeth 114 have a blade member 118 that can be identical to blade 24 (FIGS. 2, 3-7) or blade 24' (FIGS. 8-9), and there is no need to repeat the description of those blades here. Teeth 114 are fixed in recesses 112 by convex metal members 120 which operate according to known mechanisms for locking teeth, such as those described in Kolesh et al. or Roberts, referenced above, each of which is hereby incorporated by reference.

The following description of Manufacture and Operation applies generally to each of the embodiments described above.

Manufacture

Blade 24 is hard tungsten carbide, made by known techniques. Specifically, blade 24 is made by compressing the ingredients in a mold of the desired form and then sintering to fuse the ingredients using techniques known in the art. Plate 26 is made by investment casting or by traditional wrought manufacturing methods known in the art. Blade 24 is seated in the slots on the front of plate 26 and brazed in place.

Operation

When a number of blade/plate assemblies are fixed in the slots of a saw disc, the slasher can be operated by standard techniques to produce a wood product useful in pulp manufacture. Spacing between the teeth can be the same as is used for a given rotational velocity with conventional teeth.

The invention provides a smoother cut due to the balanced cutting effect of the above-described blade and to reduced lateral deflection. There is no longer a need to inventory left- and right-handed teeth, even if the total number of teeth in the saw is reduced; thus inventory costs are reduced. Labor of assembly is reduced because the notched fit of the blade into the plate is precise, resulting in a uniform blade radius for the blade edges around the circumference of the saw, and because there is no need to ensure alternating left- and right-handed blades. Time consuming adjustments and sharpening procedures are not needed. The amount of cutting power per tooth is doubled, providing a smoother cut, and the efficiency of power used is improved by the blade geometry and the smaller chip load per unit of work. The use of a hard carbide blade enhances tooth life.

Other embodiments are within the following claims. For example, the saw disc 14 may include integral flanges to support the blade tip, thus avoiding the need for a separate plate such as plate 26. Also, the blade tip may be included on a large disc, that can be oriented horizontally to fell standing trees.

I claim:

1. A wood-cutting apparatus comprising a disc rotatable about an axis in a predetermined rotational direction, said disc having a plurality of teeth, and each said tooth comprising a blade member positioned radially outwardly on said disc, said blade member comprising:
    (a) a front surface having a first front surface side edge and a second front surface side edge, each said front surface side edge extending in a generally radial direction, said front surface edges being spaced from each other in a direction generally parallel to said axis;
    (b) a central front surface connecting region positioned between said first and said second front surface side edges, said front surface connecting region being positioned rearwardly from said front surface side edges in said rotational direction;
    (c) a connecting edge extending along the most radially outward extent of said front surface connecting region, said connecting edge forming a first cutting point at its intersection with said first front surface side edge, and a second cutting point at its intersection with said second front surface side edge; each of said front surface side edges extending radially outwardly further than said connecting edge; and
    (d) a top surface extending from said connecting edge rearwardly, away from the direction of rotation, said top surface slanting radially inwardly front-to-back, said top surface having side edges and slanting radially inwardly between said side edges, whereby a top surface angle α is formed by the intersection of a plane parallel to the disc radius.

2. The apparatus of claim 1 wherein said front surface connecting region comprises two generally planar faces, each said face extending rearwardly away from said rotational direction, from one of said front surface side edges to a generally central portion where said faces intersect, and said connecting edge comprises two straight linear segments intersecting at said central portion.

3. The apparatus of claim 1 wherein said front surface comprises a generally concave surface spanning between said front surface side edges, and said connecting edge comprises a continuous curve extending between said front surface side edges.

4. The apparatus of claim 1 wherein said disc comprises a radially extending elongated slot and said plate is a flat, elongated plate.

5. The apparatus of claim 1 wherein each said tooth is positioned on the radially outward end of a flat plate, and said disc comprises a plurality of slots, each of which receives one of said plates, and each said plate comprises means to cooperate with said slot to fix said tooth in said slot.

6. The apparatus of claim 1 wherein angle α is between 120° and 160°.

7. The apparatus of claim 1 wherein said angle α is less than 150°.

8. The apparatus of claim 5 wherein said cooperating means is a cylindrical dowel that fits within an opening defined by said disc and said plate.

9. The apparatus of claim 5 wherein said slot is rounded and generally arcuate, and the surface of said tooth away from the direction of rotation is convex to cooperate with said slot.

10. The apparatus of claim 9 wherein said cooperating means is a metal member having a convex rounded surface to cooperate with said rounded slot and lock said tooth in said slot.

11. A tooth for insertion in wood cutting apparatus that comprises a disc rotatable in a predetermined direction on an axis, said tooth comprising a blade, said blade comprising:
   (a) a front surface having a first front surface side edge and a second front surface side edge, each said front surface side edge extending in a generally radial direction, said front surface edges being spaced from each other in a direction generally parallel to said axis;
   (b) a central front surface connecting region positioned between said first and said second front surface side edges, said front surface connecting region being positioned rearwardly from said front surface side edges in said rotational direction;
   (c) a connecting edge extending along the most radially outwardly extent of said front surface connecting region, said connecting edge forming a first cutting point at its intersection with said first front surface side edge, and a second cutting point at its intersection with said second front surface side edge; each of said front surface side edges extending radially outwardly further than said connecting edge; and
   (d) a top surface extending from said connecting edge rearwardly, away from the direction of rotation, said top surface slanting radially inwardly front-to-back, said top surface having side edges and slanting radially inwardly between said side edges, whereby a top surface angle $\alpha$ is formed by the intersection of a plane parallel to the disc radius.

12. The tooth of claim 11 wherein angle $\alpha$ is between 120° and 160°.

13. The tooth of claim 11 wherein angle $\alpha$ is less than 150°.

14. The tooth of claim 11 wherein said connecting region comprises two generally planar faces, each said face extending rearwardly away from said rotational direction, from one of said front surface side edges to a generally central portion where said faces intersect, and said connecting edge comprises two straight linear segments intersecting at said central portion.

15. The tooth of claim 11 wherein said front surface comprises a generally concave surface spanning between said cutting edges, and said front surface side edges comprises a continuous curve extending between said side edges.

16. The tooth of claim 11 wherein said disc comprises a radially extending elongated slot and said plate is a flat, elongated plate.

17. The tooth of claim 11 wherein said cooperating means is a cylindrical dowel that fits within an opening defined by said disc and said plate.

18. The tooth of claim 10 wherein said cooperating means is a metal member having a convex rounded surface to cooperate with said rounded slot and lock said tooth in said slot.

19. The tooth of claim 11 wherein said connecting edge forms an angle $\beta$ of between 130° and 170° when viewed in radial section.

* * * * *